United States Patent
Cui et al.

(10) Patent No.: US 12,468,747 B2
(45) Date of Patent: Nov. 11, 2025

(54) SYSTEMS AND METHODS FOR DOUBLE LEVEL RANKING

(71) Applicant: INTUIT INC., Mountain View,, CA (US)

(72) Inventors: Wendi Cui, Mountain View, CA (US); Colin P. Ryan, Mountain View, CA (US); Damien J. Lopez, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 9 days.

(21) Appl. No.: 18/590,597

(22) Filed: Feb. 28, 2024

(65) Prior Publication Data

US 2025/0272321 A1    Aug. 28, 2025

(51) Int. Cl.
*G06F 16/334* (2025.01)
*G06F 16/3332* (2025.01)

(52) U.S. Cl.
CPC ........ *G06F 16/334* (2019.01); *G06F 16/3334* (2019.01); *G06F 16/3335* (2019.01)

(58) Field of Classification Search
CPC . G06F 16/334; G06F 16/3334; G06F 16/3335
See application file for complete search history.

(56) References Cited

U.S. PATENT DOCUMENTS

| | | | | |
|---|---|---|---|---|
| 2013/0132364 | A1* | 5/2013 | Udupa | G06F 16/3334 707/E17.108 |
| 2024/0362093 | A1* | 10/2024 | Zhou | G06F 16/243 |
| 2024/0370479 | A1* | 11/2024 | Hudetz | G06F 16/316 |
| 2025/0007870 | A1* | 1/2025 | Kim | G06F 21/31 |

OTHER PUBLICATIONS

Adopting Multi-Step Search, Duffel Documentation, https://duffel.com/docs/guides/adopting-multi-step-search, Sep. 29, 2023, pp. 1-6 (Year: 2023).*

Glavas et al., "Event graphs for information retrieval and multi-document summarization", "Expert Systems with Applications", vol. 41, Issue 15, Nov. 1, 2014, pp. 6904-6916, University of Zagreb, etc. (Year: 2014).*

"Adopting Multi-Step Search", Duffel Documentation, https://duffel.com/docs/guides/adopting-multi-step-search, Sep. 29, 2023, pp. 1-6.

(Continued)

*Primary Examiner* — Matthew J Ellis
(74) *Attorney, Agent, or Firm* — DLA PIPER LLP US (57) ABSTRACT

This invention relates to systems and methods for performing double-level ranking of documents. The system implements methods for retrieving documents based on a pre-processed user query to generate a document level ranking of one or more documents that are determined to be relevant. The system implements methods for aggregating one or more sub-topic snippets from the document level ranked documents. The system further implements methods for generating a topic level ranking of the one or more sub-topic snippets. Once topic level ranking of the one or more sub-topic snippets has been performed, the system implements methods for transmitting the topic level ranked one or more sub-topic snippets to a user associated with the user query.

14 Claims, 5 Drawing Sheets

(56) References Cited

OTHER PUBLICATIONS

"Strategy Guide: Creating a Multi-Step Search", Pushpay, https://support.pushpay.com/s/article/Creating-a-Multi-Step-Search, Sep. 29, 2023, pp. 1-5.
Danielczuk et al., Mechanical Search: Multi-Step Retrieval of a Target Object Occluded by Clutter, arXiv:1903.01588v1 [cs.RO], Mar. 4, 2019, 9 pages.

* cited by examiner

SYSTEMS AND METHODS FOR DOUBLE LEVEL RANKING

BACKGROUND

Informational retrieval systems, particularly search engines, have become integral in managing the ever-increasing volumes of digital data. These systems enable users and artificial intelligence models to locate relevant information efficiently by leveraging syntactical search techniques. For many conventional information retrieval systems, keywords and topics are central to their operation, and form the basis for their semantical search. By analyzing the frequency and context of keywords within documents, information retrieval systems can identify topics and infer the relevance of a document based on a user's query.

However, there are inherent drawbacks in conventional approaches, especially when dealing with lengthy, complex documents containing multiple subtopics and a variety of keywords. In such cases, the primary issue lies in the overemphasis on keyword frequency within lengthy documents, neglecting the contextual relevance and diverse topic distribution. Such methodologies often misrepresent the importance of subtopics in search results due to inaccurate relevance assessments.

Further, another significant challenge is keyword overloading in lengthy documents. The presence of multiple keywords can skew relevance scoring, as information retrieval systems might disproportionately favor terms that frequently appear, regardless of their actual relevance to the query. This situation can lead to less pertinent results being prioritized over more relevant documents, diminishing the effectiveness of the search. Further still, in instances where information retrieval systems are coupled with artificial intelligence systems to generate and highlight accurate snippets from large documents, conventional systems may struggle to produce contextually appropriate snippets from large document encompassing multiple subtopics without a broader context. Given these challenges, there is a need for systems and methods that address the deficiencies of the aforementioned conventional approaches.

SUMMARY

The implementation of conventional information retrieval typically involves indexing documents based on keywords and using term frequency for relevance scoring. Conventional approaches often fall short in accurately representing the complexity and contextual depth of multi-topic documents. These conventional processes prioritize keyword density over semantic understanding, leading to limitations in relevance determination and query response accuracy.

However, the instant systems and methods improve upon these conventional methodologies by implementing novel indexing and ranking process. For example, initially indexing ingested documents and employing a topic parser to create sub-topic snippets, the instant system achieves a more refined understanding of the content within the documents. This is further enhanced by using a large language model (LLM) to generate paragraph-level embeddings of these snippets, thereby enabling a deeper semantic analysis beyond traditional keyword-based approaches. During the retrieval phase, the system initially produces a document-level ranked list in response to a user or Artificial intelligence (AI) query. This list is then dynamically re-ranked at the topic-level using the LLM, which analyzes the cosine similarity between an embedding representation of the query and the paragraph-level embeddings. This approach not only aligns with the user's and/or AI's intent, but also addresses the drawbacks in conventional systems associated with keyword overloading and context misrepresentation. The re-ranked list, offering contextually relevant and accurate results, is then presented to the user or AI, marking a significant advancement over conventional search engine methodologies.

Although the following description of the invention discusses the indexing, re-ranking, and retrieval of document related content, it should be appreciated that other media (e.g., images, audio, code, etc.) and data types can be similarly processed. Further, although this invention is discussed in the context of an exemplary internally facing AI chat interface, one having ordinary skill in the art should appreciate that it is not limited thereto.

DETAILED DESCRIPTION OF SEVERAL EMBODIMENTS

The present systems and methods represent a marked improvement over conventional methodologies by introducing an indexing and ranking process to search techniques. Initially, the system can index documents as they are ingested, utilizing a topic parser to dissect the content into sub-topic snippets. This granular approach allows for a more nuanced understanding of the document's content. Subsequently, the system can employ an LLM to create paragraph-level embeddings for these sub-topic snippets. This enables a more accurate semantic analysis that surpasses the capabilities of traditional keyword-based search techniques.

During the retrieval phase, the system may first generate a document-level ranked list in response to a query, which may originate from a user or an AI system. This initial list may undergo a dynamic re-ranking process at the topic level, guided by the LLM's assessment of cosine similarity between the query's embedding representation and the paragraph-level embeddings of the sub-topic snippets. This sophisticated method ensures that the results are not just aligned with the user's or AI's intent but also overcomes the common pitfalls of keyword overloading and context misrepresentation found in conventional systems.

The re-ranked list, which may be presented to the user or AI, offers contextually relevant and accurate results, signifying a substantial leap forward from traditional search engine methodologies. While the description herein primarily addresses the indexing, re-ranking, and retrieval of document-related content, it is worth noting that the inventive principles can be applied to other media types, such as images, audio, and code, as well as different data formats. Moreover, although the current discussion focuses on an example internally facing AI chat interface, those skilled in the art will recognize that the application of the present innovation is not confined to this context.

Figure 1:
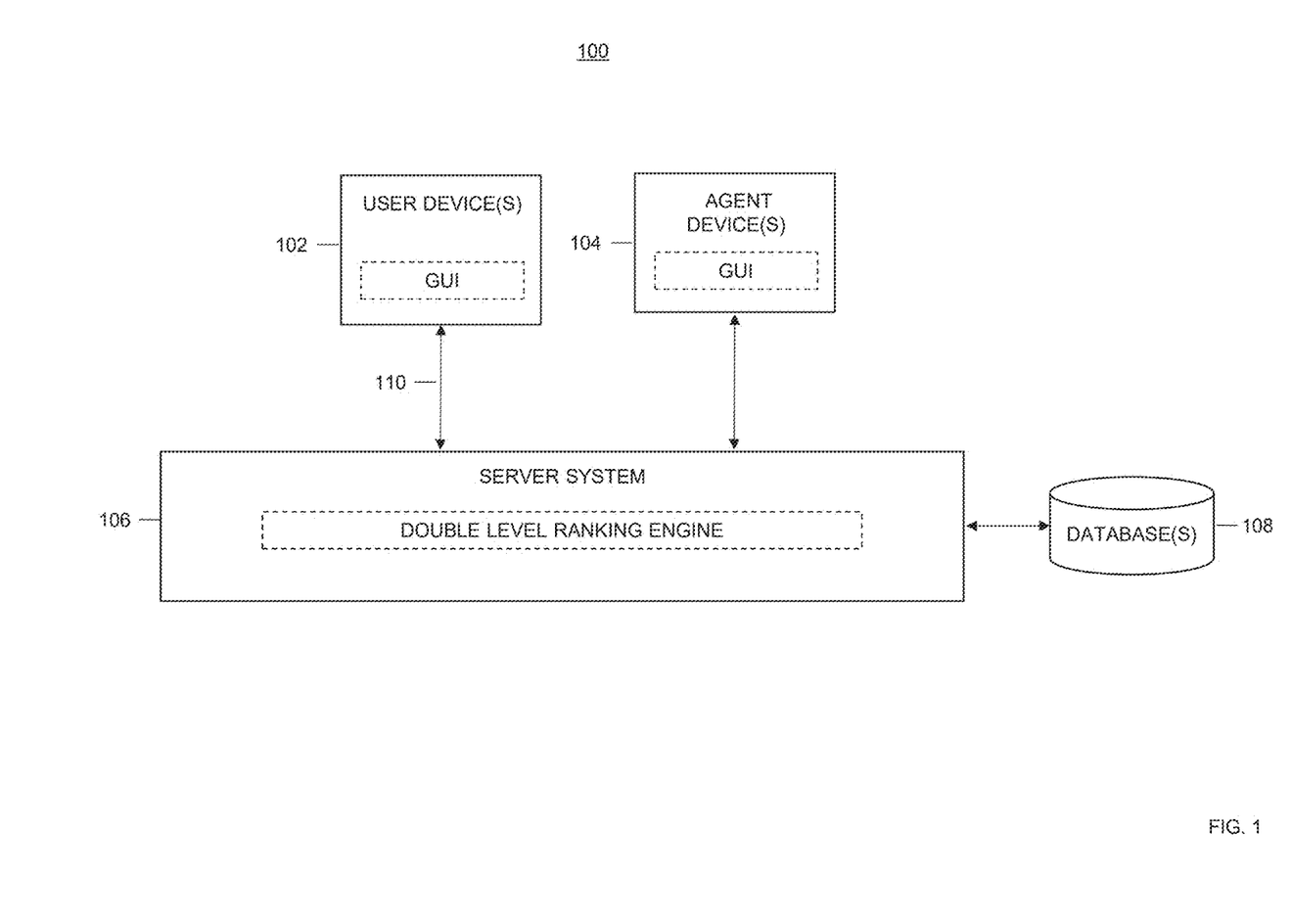
FIG. 1 shows a system configured to implement double level ranking according to an embodiment of the present disclosure.

Referring to FIG. 1, computing environment 100 can be configured to implement a double level ranking method, according to embodiments of the present disclosure. Computing environment 100 may include one or more user device(s) 102, a server system 106, one or more database(s) 108, and/or one or more agent device(s) 104, communicatively coupled to the server system 106. The user device(s) 102, one or more agent device(s) 104, server system 106, and database(s) 108 may be configured to communicate through network 110.

In one or more embodiments, user device(s) 102 is operated by a user. User device(s) 102 may be representative of a mobile device, a tablet, a desktop computer, or any computing system having the capabilities described herein. Users may include, but are not limited to, individuals such as, employees, companies, prospective clients, and/or customers of an entity associated with server system 106, such as individuals who are utilizing the services of, or consultation from, an entity associated with server system 106.

In some embodiments, a user device(s) 102 includes a non-transitory memory, one or more processors including machine readable instructions, a communications interface which may be used to communicate with the server system (and, in some examples, with the database(s) 108), a user input interface for inputting data and/or information to the user device and/or a user display interface for presenting data and/or information on the user device. In some embodiments, the user input interface and the user display interface are configured as an interactive graphical user interface (GUI). The user device(s) 102 are also configured to provide the server system 106, via the interactive GUI, input information such a user actions (e.g., queries, text, and/or documents) for further processing. In some embodiments, the interactive GUI is hosted by the server system 106 or provided via a client application operating on the user device. In some embodiments, a user operating the user device(s) 102 may query server system 106 for information related to a service provided by an entity hosting server system 106.

In one or more embodiments, each agent device(s) 104 is operated by a user under the supervision of the entity hosting and/or managing server system 106. Agent device(s) 104 may be representative of a mobile device, a tablet, a desktop computer, or any computing system having the capabilities described herein. Users of the agent device(s) 104 may include, but are not limited to, individuals such as, for example, software engineers, database administrators, employees, and/or customer service agents, of an entity associated with server system 106.

In some embodiments, each agent device(s) 104 includes a non-transitory memory, one or more processors including machine readable instructions, a communications interface that may be used to communicate with the server system (and, in some examples, with database(s) 108), a user input interface for inputting data and/or information to the user device and/or a user display interface for presenting data and/or information on the user device. In some examples, the user input interface and the user display interface are configured as an interactive GUI. The agent device(s) 104 are also configured to provide the server system 106, via the interactive GUI, input information (e.g., queries, text, and/or documents) for further processing. In some examples, the interactive GUI may be hosted by the server system 106 or it may be provided via a client application operating on the user device.

The server system 106 may include one or more processors, servers, databases, communication/traffic routers, non-transitory memory, modules, and interface components. In one or more embodiments, server system 106 hosts, stores, and operates one or more search engines and LLMs for double level ranking. Server system 106 may be configured to pre-process user input and retrieve one or more relevant documents based on the pre-processed user input via a search engine. Server system 106 may be further configured to generate a first level ranking of the one or more relevant documents. Server system 106 may be configured to aggregate one or more sub-topic snippets from the one or more relevant documents and generate a second level ranking of the one or more sub-topic snippets. Server system 106 may further be configured to generate instructions to transmit the one or more sub-topic snippets to a user associated with the user input.

Server system 106 may include security components capable of monitoring user rights and privileges associated with initiating API requests for accessing the server system 106 and modifying data in database(s) 108. Accordingly, the server system 106 may be configured to manage user rights, manage access permissions, manage object permissions, and/or the like. The server system 106 may be further configured to implement two-factor authentication, secure sockets layer (SSL) protocols for encrypted communication sessions, biometric authentication, token-based authentication, and/or the like.

Database(s) 108 may be locally managed, and/or may be a cloud-based collection of organized data stored across one or more storage devices. Database(s) 108 may be complex and developed using one or more design schema and modeling techniques. Database(s) 108 may be hosted at one or more data centers operated by a cloud computing service provider. Database(s) 108 may be geographically proximal to or remote from the server system 106 and is configured for data dictionary management, data storage management, multi-user access control, data integrity, backup and recovery management, database access language application programming interface (API) management, and/or the like. Database(s) 108 may be in communication with server system 106, end user device(s) 102, and agent device(s) 104, via network 110. Database(s) 108 may store various data, including training data (e.g., a corpus of queries, documents, and/or text) that can be modified and leveraged by server system 106 and agent device(s) 104. Various data in the database(s) 108 will be refined over time using a double level ranking engine, and/or one of the search engines, and LLMs discussed with respect to FIGS. 2-3. Additionally, database(s) 108 may be deployed and maintained automatically by one or more components shown in FIG. 1.

Network 110 may be of any suitable type, including individual connections via the Internet, cellular or Wi-Fi networks. In some embodiments, network 110 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, LAN, or the Internet. Because the information transmitted may be personal or confidential, security concerns may dictate one or more of these types of connection be encrypted or otherwise secured. In some embodiments, however, the information being transmitted may be less personal, and therefore, the network connections may be selected for convenience over security. In some embodiments, communication between the elements may be facilitated by one or more application programming interfaces (APIs). APIs of server system 106 may be proprietary and/or may be examples available to those of ordinary skill in the art such as Amazon® Web Services (AWS) APIs or the like.

Figure 2:
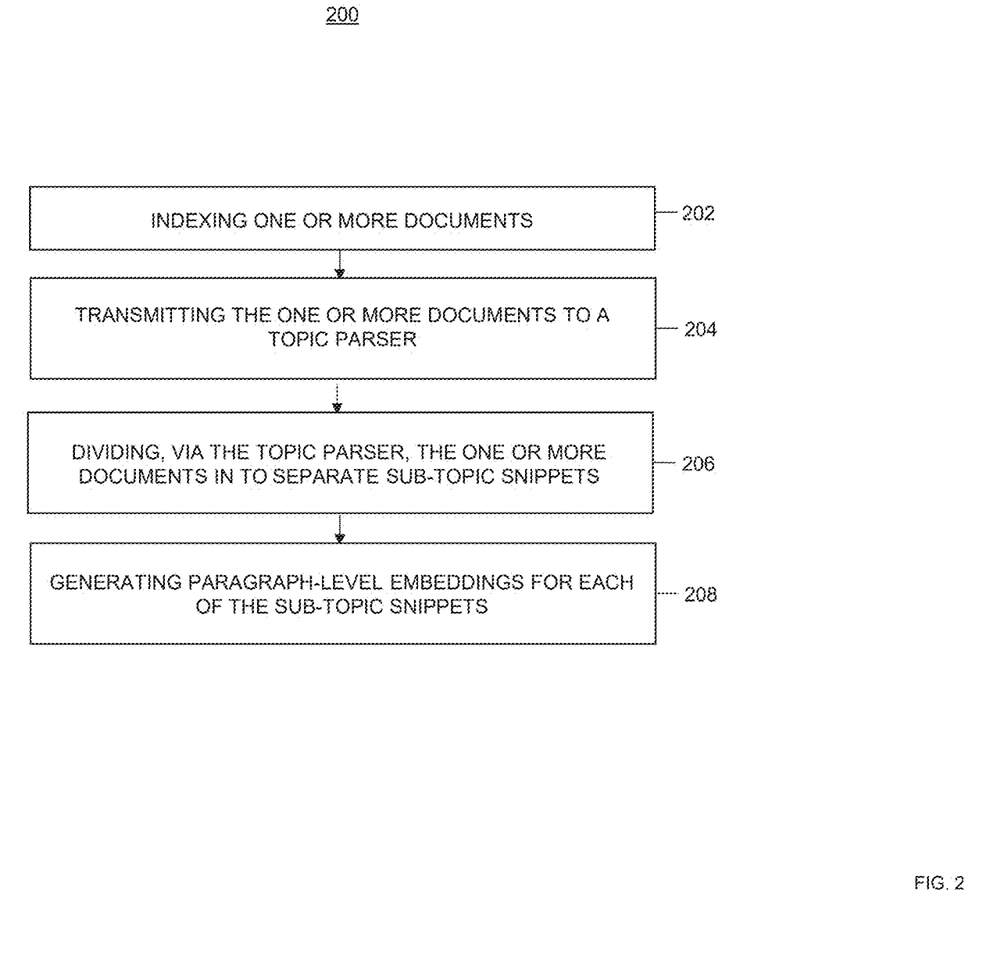
FIG. 2 shows an indexing method according to an embodiment of the present disclosure.

FIG. 2 shows an indexing method 200 according to an embodiment of the present disclosure. The entire computing environment 100 may work together to perform indexing method 200. In some instances, computing environment 100 may be configured to host an AI chat interface that can display one or more documents that may be indexed in furtherance of indexing method 200. In one instance, server system 106 may be configured to index documents related to an organization's human resources and employee benefits. At 202, server system 106 may implement instructions for indexing one or more documents. Here, server system 106 may ingest one or more documents (e.g., employee handbook, employee stock purchase plan, employee leave policy, employee training, and the like) into database(s) 108 to be stored based on a pre-determined criteria (e.g., by category, media type, etc.) or format for subsequent retrieval. At 204, server system 106 may transmit the one or more documents to a topic parser. For example, server system 106 may retrieve each document from database(s) 108 and electronically pass it topic parser.

At 206, server system 106 may divide the one or more documents into separate sub-topics snippets via the topic parser. For example, in furtherance of indexing the one or more documents, each document can be passed to a topic parser that is configured to divide the content of the documents into sub-topic snippets. This may involve leveraging HTML formatting parsing and/or an LLM to separate the sub-topic snippets by topic and/or at the paragraph-level. HTML formatting parsing may include one or more process that involve breaking down code associated document into recognizable tokens, such as tags, and attributes via an HTML parser. In some instances, a document object model (DOM) may be automatically created based on the tokens to represent the structure of the document. Once the content of the document is tokenized and/or the DOM is created, one or more sub-topics may be identified for further downstream processing or use. As an alternative, an LLM may divide the content of the one or more documents into separate topics. In some embodiments the LLM may employ natural language processing techniques to parse and understand the text. This may involve tokenization, part-of-speech tagging, generating embeddings, and syntactic parsing to understand the grammatical structure. Here, the model further utilizes contextual embeddings, where each word or token is represented in the context of its surrounding text, allowing the model to grasp nuanced meanings and differentiations in similar words used in different contexts.

Further, the LLM may analyze the frequency of terms within the document, identifying those that appear more often and are thus likely to indicate key topics. Additionally, by leveraging embeddings, the model may assess the semantic relationships between different terms, identifying clusters of related terms that signify a topic. The LLM may apply segmentation algorithms to identify shifts in topic within text. This can involve detecting changes in the pattern of term usage or shifts in semantic embeddings. For each potential subtopic segment, the model evaluates the local context, examining how terms and their meanings change in relation to the surrounding text, which helps in delineating subtopics. The LLM may additionally employ clustering algorithms (e.g., K-means or hierarchical clustering) on embeddings to group text segments into topics and subtopics based on their semantic similarity. This may involve using supervised or unsupervised machine learning techniques, wherein the LLM classifies these clusters into predefined or dynamically generated topic categories.

As an output, the LLM may reconstruct the document's structure, organizing it into the identified, and now retrievable, topics and sub-topics snippets. This may also involve generating summaries for each topic or sub-topic snippet, thereby providing concise overviews of the segmented content. Architecturally, the LLM may leverage one or more encoder and decoder components enhanced with self-attention mechanisms that can be used for dissecting documents into distinct topics and sub-topics. The encoders may be configured to process large volumes of textual data (or alternatively image data, and/or audio data) and may further employ self-attention to analyze and assign relevance to various topics and sub-topics. Here, the encoders may generate embeddings that capture both semantic and contextual insights from the topics and sub-topics. These insights encompass not only the explicit meaning of words and phrases but also their broader context within a document, enabling the identification of various topics and sub-topics. The self-attention capabilities ensure that the embeddings reflect both the semantic content and the contextual nuances of the document, thereby facilitating price document segmentation. The decoders can employ these embeddings to categorize the documents and each document's topics and sub-topics with a high degree of accuracy.

Regardless of approach, the output of 206 may be one or more separate sub-topics snippets. As an example, a topic parser may divide an employee stock purchase plan document into one or more sub-topics (e.g., eligibility section, key dates/events section, and vesting requirements section) identified from within the document.

At 208, server system 106 may generate paragraph-level embeddings of the sub-topic snippets. Here, server system 106 may leverage an LLM to convert the sub-topic snippets into vector embeddings. As an example, server system 106 may convert the sub-topics from the employee stock purchase plan document into separate embeddings at the paragraph level. This may involve identifying each paragraph within each sub-topics (e.g., eligibility section, key dates/events section, and vesting requirements section) within the document and converting these paragraphs into separate embeddings. The LLM may be used in conjunction with or independently from the HTML parser. In one instance, the LLM may receive sub-topic snippets from the HTML parser and convert the tokens into paragraph level embeddings. In another instance, the HTML parser may not be utilized and the LLM may divide the sub-topic snippets into paragraph-level embeddings. Once created, the sub-topic paragraph-level embeddings may be stored in a database that is configured and optimized for receiving specialized queries associated with vectors. This database may be separate from the database that stores the one or more documents; yet both databases may be in computing environment 100, for example in database(s) 108.

Figure 3:
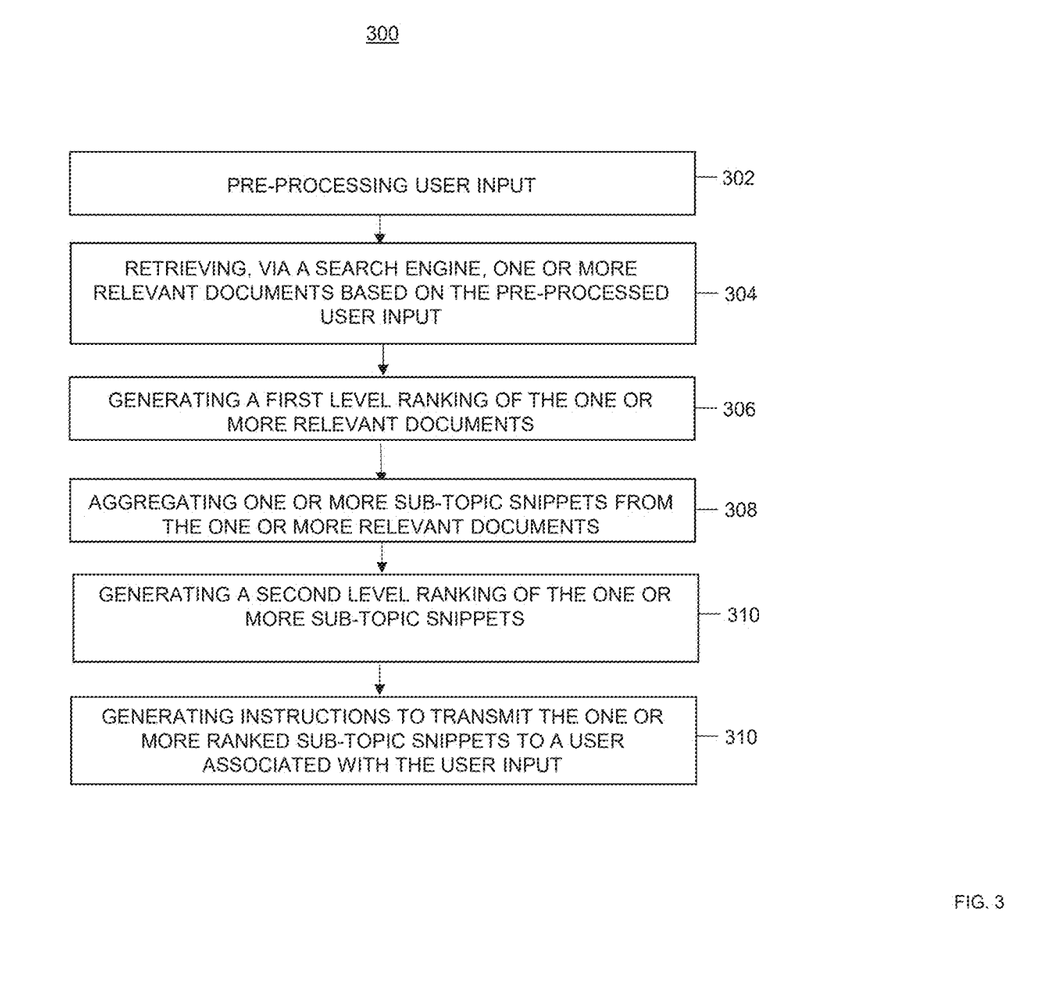
FIG. 3 shows a search and retrieval method according to an embodiment of the present disclosure.

FIG. 3 shows a search and retrieval method 300 according to an embodiment of the present disclosure. Search and retrieval method 300 may be implemented by one or more components in computing environment 100. At 302, server system 106 may pre-process user input. Here, server system 106 may receive a query (e.g., a query about an employee stock purchase program) from a user operating the AI chat interface, (GUI interface or AI model) discussed in relation to indexing method 200, and responsively analyze the query for context. This may involve server system 106 implementing one or more natural language processing techniques, such as stemming, lemmatization, stop word removal, and generating an embedding representation of the query. Stemming may include a process that reduces the identified words in the query to their respective stem words by, for example, removing prefixes and suffixes, thereby generating lemmas. Lemmatization may include determining the meaning of a word based on its intended meaning. A lemmatization model may identify one or more words in a query, determine word variations for each word, and determine the root word for each word based on the variations. The lemmatization process may also result in the generation of a lemma. Stop word removal may involve removing common and/or non-meaningful words (e.g., "the" and "and' from the query.

At 304, server system 106 may retrieve one or more relevant documents based on the pre-processed user input. For example, in furtherance of processing the query, server system 106 may retrieve one or more documents from database(s) 108 via a search engine. Here, the server system 106 may identify the one or more documents (e.g., documents related to the employee stock purchase program) that are relevant to the user query based on the pre-processed user input. This may involve performing a keyword search on database(s) 108 based on the stemmed and lemmatized words at 302, to identify relevant documents. In addition, or alternatively, the search engines may employ semantic vector search, knowledge graph search, and/or cognitive search. In instances where semantic search is employed, the search engine can interpret the intent and contextual meaning of queries. In instances where semantic vector search is utilized, the search engine may leverage embeddings to find textually and contextually similar results. When cognitive search is employed, the search engine may integrate user-specific variables like past interactions and current session behavior and process these actions via machine learning to tailor search outcomes, thereby delivering highly relevant and personalized text retrieval.

At 306, server system 106 may generate a first level ranking of the one or more relevant documents. Here, in furtherance of retrieving the one or more relevant documents (e.g., documents that were indexed during indexing method 200), server system 106 may rank the retrieved documents (e.g., documents related to the employee stock purchase program) using a search engine based on metrics such as keyword frequency, the documents' structure, the identified topics in the documents, the quality of the content in the documents, the overall authority of the documents, semantic analysis, and/or the known history associated with the user (or similarly situated users) operating the AI chat interface. For example, the search engine may determine which documents have the highest count of a particular keyword (e.g., pre-processed user input) and retrieve these documents as relevant candidates to be ranked by the search engine in order of relevance. In some instances, each document is assigned an initial relevance score based on one or more of the aforementioned metrics. In some instances, advanced ranking metrics are applied by the search engine, such as, PageRank to assess the number and quality of inbound links to each document. As a result of applying these metrics, the search engine may rank the documents in the order of relevance based on the combined score of these metrics.

At 308, server system 106 may aggregate one or more sub-topic snippets from the one or more relevant documents that were ranked at the document-level at 306. Here, server system 106 may leverage an LLM, that is configured to perform sub-topic snippet analysis, to identify each specific sub-topic snippets from the one or more relevant, ranked documents at 306. Snippet analysis may involve the LLM analyzing sub-topic paragraph-level embeddings that were generated at 208 and aggregated for further analysis.

As an example, the LLM may analyze sub-topic paragraph-level embeddings that were generated during the indexing phase. During the analysis, the LLM may identify sub-topic paragraph-level embeddings that are semantically and/or syntactically similar to the embedding representation of the query (e.g., the query about an employee stock purchase program). The identified sub-topic paragraph-level embeddings that are most relevant to the embedding representation of the query are then aggregated.

At 310, server system 106 may generate a second level ranking of the one or more sub-topic snippets. Here, server system 106 may analyze the aggregated one or more sub-topic snippets from the one or more relevant documents and rank them by performing topic-level ranking. In one instance, this may involve computing the cosine similarity between the sub-topic paragraph-level embeddings and the embedding representation of the query to measure how semantically similar they are to each other. Additionally, or alternatively, each sub-topic paragraph-level embeddings may be assigned a relevance score based on factors such as the depth of topic coverage and the presence of key concepts related to the query.

Respective to the applied approach, the sub-topic paragraph-level embeddings may be ranked based on their cosine similarity and/or relevance scores. Here, higher cosine similarity scores, or higher relevance scores, may indicate higher relevance to the query. Accordingly, the sub-topic paragraph-level embeddings may be sequentially ranked such that the sub-topic paragraph-level embeddings with the highest score are ranked first (i.e., are the most relevant), followed by the next sub-topic paragraph-level embeddings with the second highest score, and so on, until each of the sub-topic paragraph-level embeddings are ranked in order.

As an example, server system 106 may leverage an LLM to rank the one or more sub-topic snippets that were aggregated at 308. As described, the LLM may rank the one or more sub-topic paragraph-level embeddings based on their cosine similarity. Here, the higher the score, the higher the one or more sub-topic paragraph-level embeddings will be ranked by the LLM.

At 312, server system 106 may generate instructions to transmit the one or more ranked sub-topic snippets to a user associated with the user input. Here, server system 106 may generate and/or implement computer-implemented instructions to transmit the one or more ranked sub-topics snippets that correspond to the next sub-topic paragraph-level embeddings that were ranked to 310 to the user that submitted the query. In some instances, the user may receive sub-topic snippets and/or the entire document that it is associated with it via the AI chat interface or GUI interface associated with user device(s) 104. In another instance, where the query was generated by an AI model, the sub-topic snippets may be transmitted to the AI model.

Figure 4:
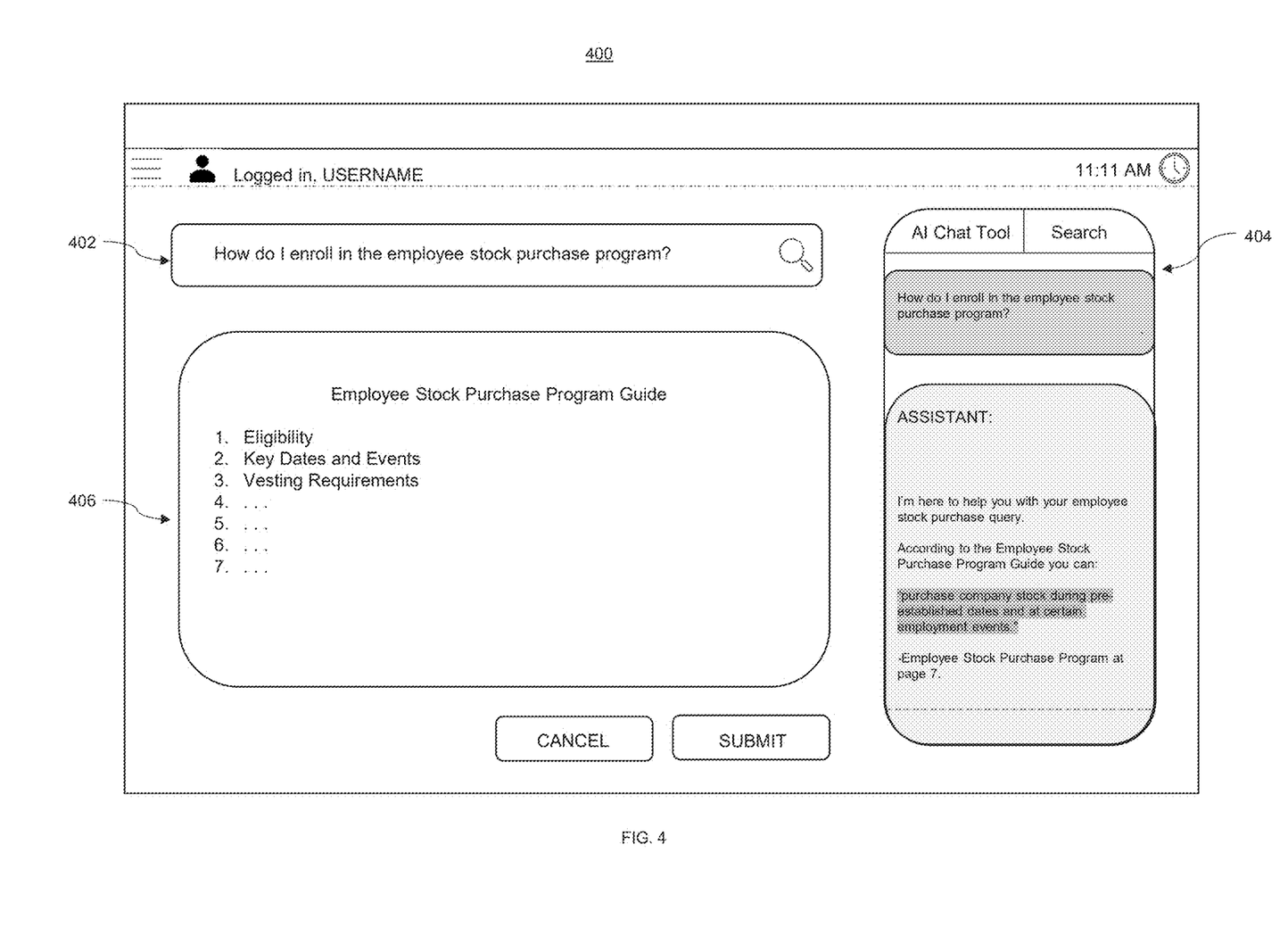
FIG. 4 illustrates an interactive graphical user interface, according to various embodiments of the present disclosure.

FIG. 4 illustrates an interactive graphical user interface (GUI) 400 depicted, according to various embodiments of the present disclosure. In some instances, the interactive GUI 400 may be a stand-alone application, or a sub-feature associated within a software product or website. The interactive GUI 400 may be operated by one or more users using one or more user device(s) 102. In other instances, interactive GUI 400 may be operated by one or more users using one or more user device(s) 104. Accordingly, it should be appreciated that an interactive graphical user interface (GUI) 400 may be used by users that are internal or external to an entity that hosts interactive graphical user interface (GUI) 400 and server system 106. In some embodiments, interactive GUI 400 initiates and plays an integral role for processes associated with receiving user queries and retrieving relevant documents as discussed with respect to FIG. 3. As depicted in FIG. 4, interactive GUI 400 includes several dynamic features for capturing user queries, enabling real-time AI chat communication, and dynamically populating content. In the illustrated example, interactive GUI 400 includes a user query region 402, AI chat interface region 404, and dynamic results region 406.

As depicted in user query region 402, a search bar/field may be provided to allow users to enter queries or to navigate menus and directories. Search/query assistance options may be populated in response to the type of action being performed by a user and/or in response to real-time updates occurring in the AI chat interface region 404, and/or the dynamic results region 406.

AI chat region 404 may enable a user to receive additional information or suggestions regarding a particular document (e.g., an employee stock purchase program guide) or a specific topic (e.g., employee stock purchase program eligibility) in real-time via an automated AI intelligent assistant or AI chat interface. For example, in response to receiving a query related to enrolling in an employee stock purchase program in user query region 402, or directly in AI chat region 404, the AI chat interface communicates with a user via a chat box within AI chat region 404 and provides information related to the query, such as a relevant snippet of text than answers the user's query. As another example, a user may conduct a search in the AI chat region 404 to find additional resources and information; for example, a ranked list of sub-topic snippets and/or documents.

Dynamic results region 406 may dynamically populate with relevant information and tools, in response to the type of activity the user is engaged in. For example, in response to a user selecting a snippet, topic, or document from AI chat region 404, dynamic results region 406 automatically populates with information related to or contained in the selected document. For example, in response to a user selecting a snippet or document in AI chat region 404, dynamic results region 406 may populate with that document or more information about that document. In the instance that a document is editable, dynamic results region 406 may enable and/or prompt a user to add information to the document or it may populate information in the document for the user.

Figure 5:
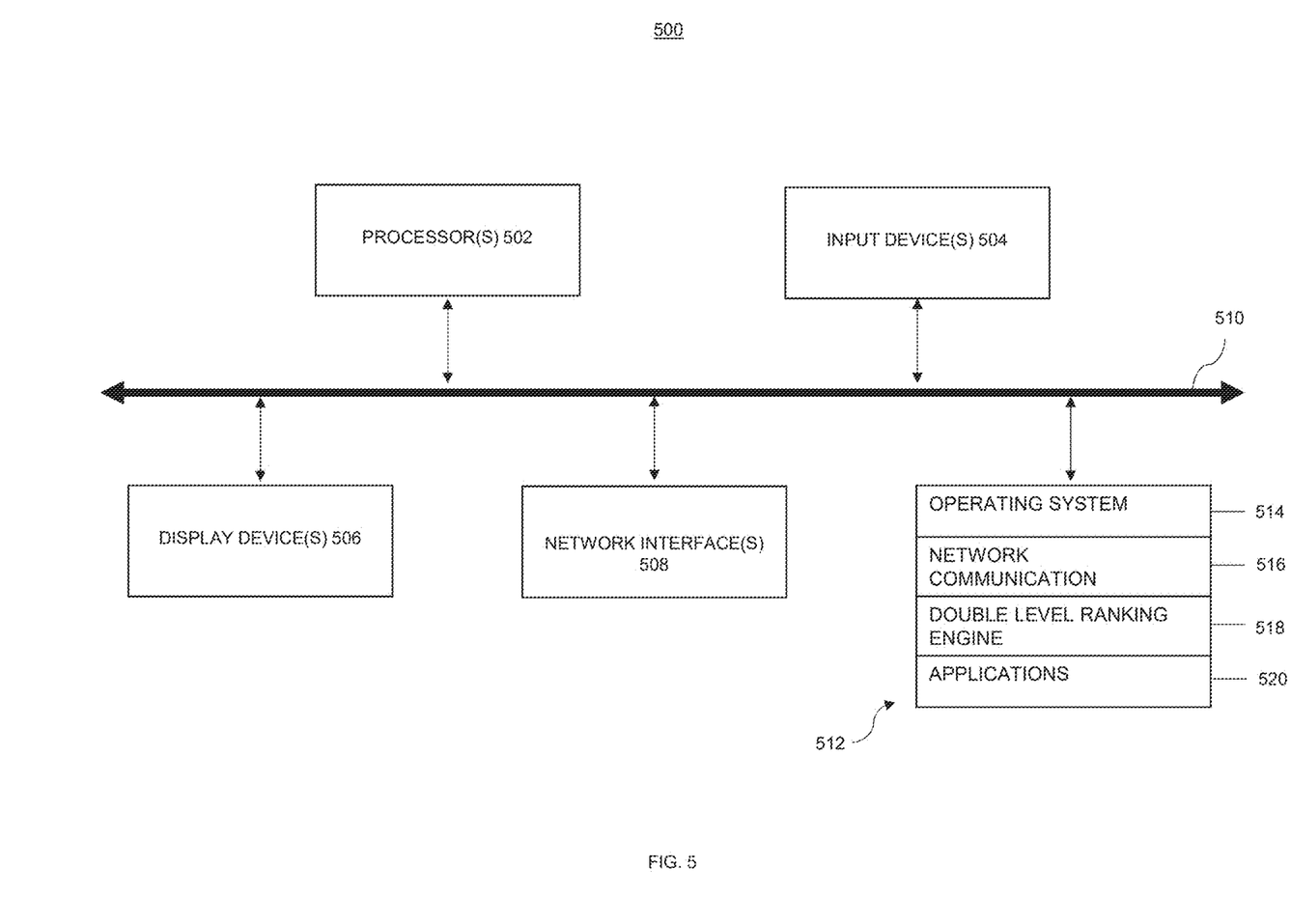
FIG. 5 shows an example computing device according to an embodiment of the present disclosure.

FIG. 5 is a block diagram of an example computing device 500 that may implement various features and processes as described herein. For example, in some embodiments the computing device 500 may function as the user device(s) 102, agent device(s) 104, and/or server system 106 or a portion of any of these elements. The computing device 500 may be implemented on any electronic device that runs software applications derived from instructions, including without limitation personal computers, servers, smart phones, media players, electronic tablets, game consoles, email devices, etc. In some implementations, the computing device 500 may include processor(s) 502, one or more input device 504, one or more display device 506, one or more network interfaces 508, and one or more computer-readable medium 512. Each of these components may be coupled by a bus 510.

The display device 506 may be any known display technology, including but not limited to display devices using Liquid Crystal Display (LCD) or Light Emitting Diode (LED) technology. The processor(s) 502 may use any known processor technology, including but not limited to graphics processors and multi-core processors. The input device 504 may be any known input device technology, including but not limited to a keyboard (including a virtual keyboard), mouse, track ball, and touch-sensitive pad or display. The bus 510 may be any known internal or external bus technology, including but not limited to ISA, EISA, PCI, PCI Express, USB, Serial ATA or FireWire. The computer-readable medium 512 may be any non-transitory medium that participates in providing instructions to the processor(s) 502 for execution, including without limitation, non-volatile storage media (e.g., optical disks, magnetic disks, flash drives, etc.), or volatile media (e.g., SDRAM, ROM, etc.).

The computer-readable medium 512 may include various instructions for implementing an operating system 514 (e.g., Mac OS®, Windows®, Linux). The operating system may be multi-user, multiprocessing, multitasking, multithreading, real-time, and the like. The operating system may perform basic tasks, including but not limited to: recognizing input from the input device 504; sending output to the display device 506; keeping track of files and directories on the computer-readable medium 512; controlling peripheral devices (e.g., disk drives, printers, etc.) which can be controlled directly or through an I/O controller; and managing traffic on the bus 510. The network communications instructions 516 may establish and maintain network connections (e.g., software for implementing communication protocols, such as TCP/IP, HTTP, Ethernet, telephony, etc.).

The double level ranking engine 518 may include instructions that enable computing device 500 to implement one or more methods as described herein. Applications 520 may be an application that uses or implements the processes described herein and/or other processes. The processes may also be implemented in the operating system 514. For example, applications 520 and/or operating system 514 may execute one or more operations to implement double level ranking of one or more documents and their corresponding sub-topics.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java, python, and the like), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A system comprising:
    at least one processor; and
    at least one non-transitory computer readable medium storing instructions that, when executed by the at least one processor, cause the at least one processor to perform processing comprising:
    pre-processing a user input;
    retrieving, via a search engine, one or more relevant documents based on the pre-processed user input;
    generating a first level ranking of the one or more relevant documents by scoring the one or more relevant documents and ordering the one or more relevant documents based at least on the scoring;
    aggregating one or more sub-topic snippets from the first level ranked one or more relevant documents;
    generating, via a large language model, a second level ranking of the one or more sub-topic snippets by:
        calculating a cosine similarity between each of the one or more sub-topic snippets and the pre-processed user input; and
        ordering the one or more sub-topics snippets based on the calculated cosine similarities;
    generating instructions to transmit the one or more ordered sub-topic snippets to a user associated with the user input;
    receiving a user selection of one of the one or more ordered sub-topic snippets; and
    dynamically populating a user interface with additional information related to the sub-topic snippet.

2. The system of claim 1, wherein generating the first level ranking further comprises assigning, via the search engine, a relevance score to the one or more relevant documents based on one or more metrics including: keyword frequency or document authority.

3. The system of claim 1, further comprises converting, by the least one processor, the one or more sub-topic snippets into sub-topic level paragraph-level embeddings.

4. The system of claim 1, wherein generating the second level ranking includes ranking sub-topic paragraph-level embeddings corresponding the one or more sub-topic snippets based on cosine similarity.

5. The system of claim 1, wherein pre-processing the user input includes one or more of: stemming, lemmatization, stop word removal, and embedding generation.

6. The system of claim 1, ingesting and analyzing the one or more relevant documents, by the at least one processor implementing a topic parser, to divide each of the one or more relevant documents into sub-topic snippets.

7. The system of claim 1, aggregating, by the at least one processor, the one or more sub-topic snippets are aggregated from the one or more relevant documents via the large language model, wherein the large language model is configured for snippet analysis.

8. A computer-implemented method comprising:
    pre-processing, by at least one processor, a user input;

retrieving, via a search engine, one or more relevant documents based on the pre-processed user input;

generating a first level ranking of the one or more relevant documents by scoring the one or more relevant documents and ordering the one or more relevant documents based at least on the scoring;

aggregating, by the least one processor, one or more sub-topic snippets from the first level ranked one or more relevant documents;

generating, by a large language model, a second level ranking of the one or more sub-topic snippets by:
 calculating a cosine similarity between each of the one or more sub-topic snippets and the pre-processed user input; and
 ordering the one or more sub-topics snippets based on the calculated cosine similarities;

generating, by the least one processor, instructions to transmit the one or more ordered sub-topic snippets to a user associated with the user input;

receiving a user selection of one of the one or more ordered sub-topic snippets; and dynamically populating a user interface with additional information related to the sub-topic snippet.

9. The computer-implemented method of claim 8, wherein generating the first level ranking further comprises assigning, via the search engine, a relevance score to the one or more relevant documents based on one or more metrics including: keyword frequency or document authority.

10. The computer-implemented method of claim 8, further comprises converting, by the least one processor, the one or more sub-topic snippets into sub-topic level paragraph-level embeddings.

11. The computer-implemented method of claim 8, wherein generating the second level ranking includes ranking sub-topic paragraph-level embeddings corresponding the one or more sub-topic snippets based on cosine similarity.

12. The computer-implemented method of claim 8, wherein pre-processing user input includes one or more of: stemming, lemmatization, stop word removal, and embedding generation.

13. The computer-implemented method of claim 8, ingesting and analyzing the one or more relevant documents, by the at least one processor implementing a topic parser, to divide each of the one or more relevant documents into sub-topic snippets.

14. The computer-implemented method of claim 8, aggregating, by the at least one processor, the one or more sub-topic snippets are aggregated from the one or more relevant documents via large language model, wherein the large language model is configured for snippet analysis.

* * * * *